March 22, 1932.  E. C. BALLMAN  1,850,068

MOUNTING FOR BALL BEARINGS

Filed Nov. 3, 1927

Inventor:
Edwin C. Ballman,
by John W. Burrows
His Attorney.

Patented Mar. 22, 1932

1,850,068

UNITED STATES PATENT OFFICE

EDWIN C. BALLMAN, OF ST. LOUIS, MISSOURI

MOUNTING FOR BALL BEARINGS

Application filed November 3, 1927. Serial No. 230,712.

This invention pertains to ball bearings and more particularly to means for mounting such bearings in motors and the like.

The usual practice in equipping an electric motor with ball bearings is to mount a bearing at each end of the shaft in a suitable housing. One of these bearings is usually rigidly fixed in the housing so that there is no chance of endwise movement thereof. The other bearing is usually slidably mounted so that this bearing may move under the influence of expansion and contraction of the motor shaft. With bearings mounted in this way, the one that is rigidly fixed is called upon to secure the motor shaft in a fixed position and to take all stresses due to forces tending to move the shaft endwise. The result is that this bearing is often broken or damaged by endwise stresses or shocks which may be put upon the shaft; for instance, when driving on a pulley or when shipping a motor with its shaft in vertical position, in which case the fixed bearing must support the weight of the armature, and the vibrations and shocks due to travel may cause injury to the bearing. Such injury usually takes the form of dents made in the ball races by the balls, and such dents usually cause breakage of the balls when the motor is put in operation.

One of the objects of this invention is to provide a construction in which the bearings will be so mounted as to relieve such endwise strains or shocks.

Another object is to provide a mounting which will permit the bearing to yield under certain endwise forces.

Another object is to provide a construction whereby such yielding may be obtained while at the same time maintaining perfect lubrication and a good dust seal.

Figure 1:
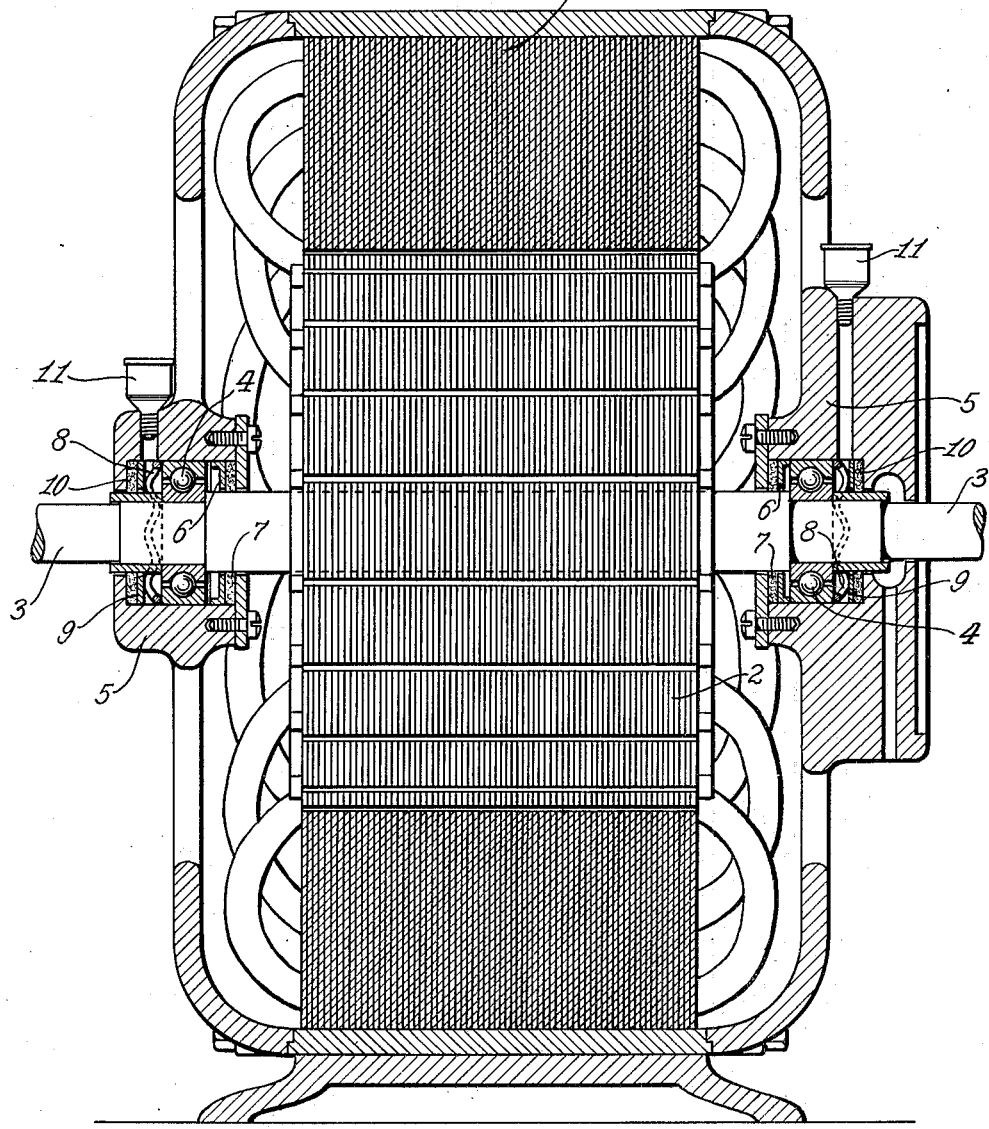
Figure 2:
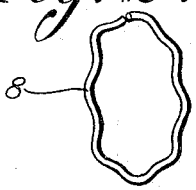

Further objects will appear from the following description, taken in connection with the accompanying drawings, in which Figure 1 is a sectional view of the electric motor equipped with ball bearings embodying this invention; and Figure 2 is a perspective of the corrugated spacing ring.

Referring now to the drawings, 1 designates the stator and 2 the rotor of the machine. The rotor is provided with a shaft 3, which is equipped with ball bearings 4 of any suitable type.

In accordance with the present invention, both of the ball bearings 4 are slidably mounted in suitable housings 5 in the motor end plates.

On the inner side of the bearing 4—that is, on the side toward the armature—the outer race of said bearing abuts against a cup-shaped washer 6. The outer rim of this washer is turned up slightly and bears against the outer race of the bearing, as illustrated in the drawings. The flat portion of this washer abuts against a yielding washer 7 of felt or other suitable material of a yielding nature. On the outer side of the ball bearing, a spacing ring 8 bears against the outer ball race. This ring may be constructed of spring wire and corrugated or crinkled axially, as shown in Figure 2. Just outside of the corrugated ring 8 is a flat washer 9 which, in turn, bears against a yielding washer 10, similar to the washer 7 just described.

It will be seen that each bearing is held between washers which abut on opposite sides against yielding washers 7 and 10. The spacing ring 8 may also have yielding qualities and serves to provide a space between the bearing and the washer 10 to accommodate a lubricant supplied by a grease cup 11 or similar device.

By this construction any end stress or shock coming on the shaft 3 will be taken up by one or the other of the bearings 4 and transmitted to one or the other of the washers 7 or 10. Both of these washers will yield under shock or pressure and thereby reduce the stress imposed upon the ball races. This construction also provides for a limited movement under thermal expansion and construction of the motor parts. In either case, the washers 6 and 9 serve to distribute the stress over the surfaces of the yielding washers 7 and 10. The felt washers 7 and 10 may be made to fit close to the shaft so as to provide a dust seal upon either side of the bearing.

It has been found in practice that this construction obviates the denting of ball races, which was a frequent occurrence with prior types of construction.

It is obvious that various changes may be made in the details of construction without departing from the spirit of this invention; it is to be understood, therefore, that this invention is not limited to the specific details shown and described.

Having thus described the invention, what is claimed is:

1. A bearing, comprising, a support, a ball bearing slidably mounted in said support, a shock-absorbing pad between said bearing and said support, and a yielding washer between said pad and said bearing adapted to yieldingly retain the latter against endwise movement.

2. A bearing, comprising, a support, a ball bearing slidably mounted in said support, a spring washer adapted to retain said bearing against endwise movement, and a yielding abutment for said washer.

3. In a motor having a shaft, a ball bearing at each end of said shaft, a support for each of said bearings, means for slidably mounting said bearings in said supports, and shock-absorbing retainers on opposite sides of said bearings.

4. A bearing, comprising, a support, a ball bearing slidably mounted in said support, and a yielding pad between said bearing and said support, a washer for distributing the pressure on said pad, and yielding pressure means between said bearing and said distributing means.

5. A bearing, comprising, a support, a ball bearing slidably mounted in said support, a yielding washer adapted to yieldingly retain said bearing against endwise movement, and a resilient spacing washer between said yielding washer and said bearing adapted to admit lubricant to said bearing.

6. A bearing comprising a support, a ball bearing slidably mounted in said support, a yielding fibrous pad mounted in thrust receiving relation with said ball bearing, and spacing means between said pad and said ball bearing.

7. A bearing comprising, a support, a ball bearing slidably mounted in said support, a yielding fibrous pad mounted in thrust receiving relation with said ball bearing, and an irregular washer forming radial openings between said ball bearing and said pad.

8. A bearing, comprising, a support having a port for admission of lubricant, a ball bearing slidably mounted in said support, a shock-absorbing pad between said bearing and said support, and yielding spacing means between said pad and said ball bearing formed to provide a passage from said port to said ball bearing.

9. A bearing, comprising, a support having a port for admission of lubricant, a ball bearing slidably mounted in said support, a shock-absorbing pad between said bearing and said support, and yielding spacing means between said pad and said ball bearing formed to provide a passage therethrough communicating with said port.

In testimony whereof I affix my signature this 10th day of May, 1926.

EDWIN C. BALLMAN.

CERTIFICATE OF CORRECTION.

Patent No. 1,850,068.                                                Granted March 22, 1932, to

EDWIN C. BALLMAN.

It is hereby certified that error appears in the printed specification of the above numbered patent requiring correction as follows: Page 2, line 28, claim 3, for the compound word "shock-absorbing" read thrust-absorbing; and that the said Letters Patent should be read with this correction therein that the same may conform to the record of the case in the Patent Office.

Signed and sealed this 21st day of June, A. D. 1932.

(Seal)                                                               M. J. Moore,
Acting Commissioner of Patents.